Figure 1:
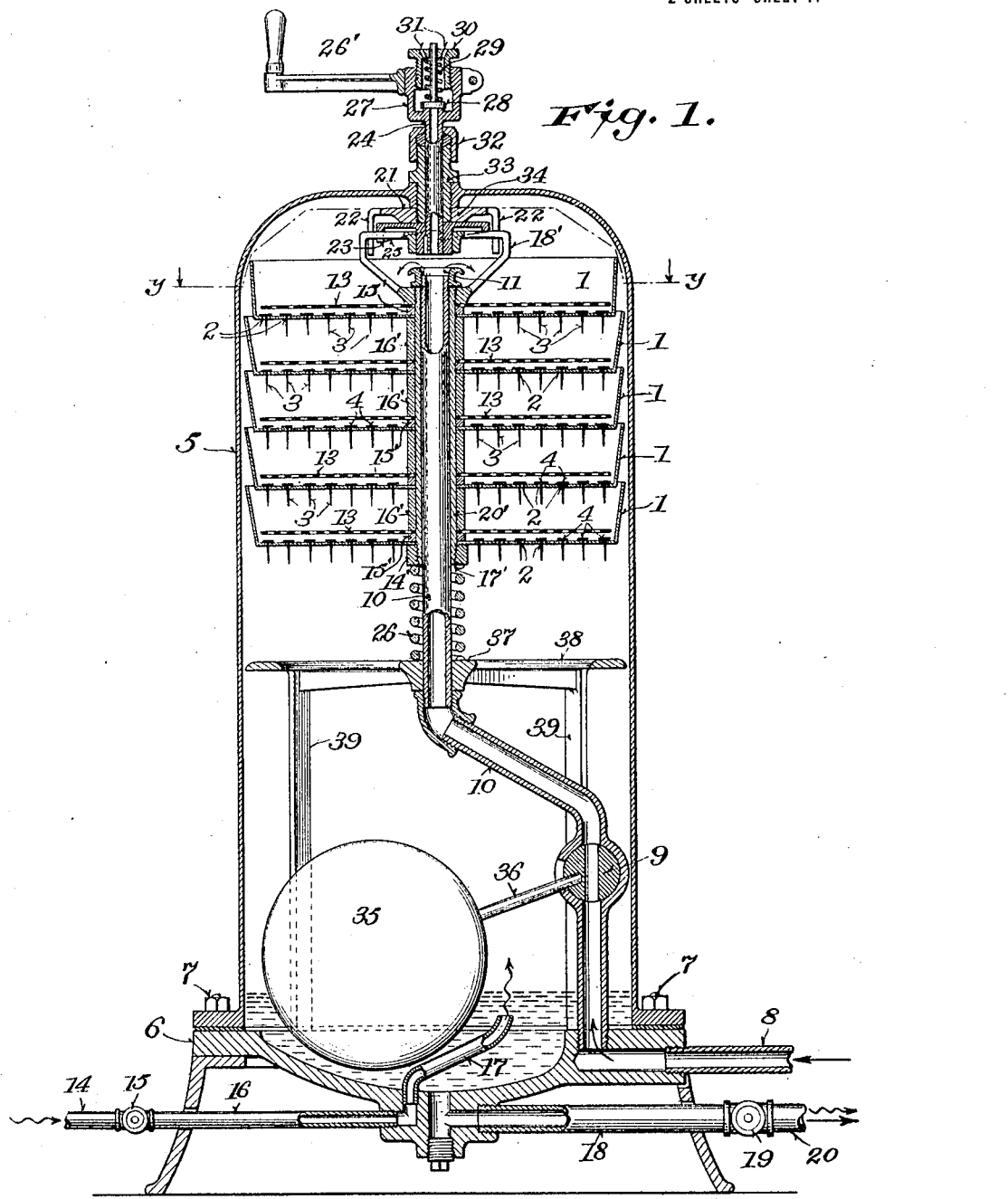

G. H. MAAS.
CARBONATOR AND THE LIKE.
APPLICATION FILED AUG. 19, 1914.

1,207,061.

Patented Dec. 5, 1916.
2 SHEETS—SHEET 1.

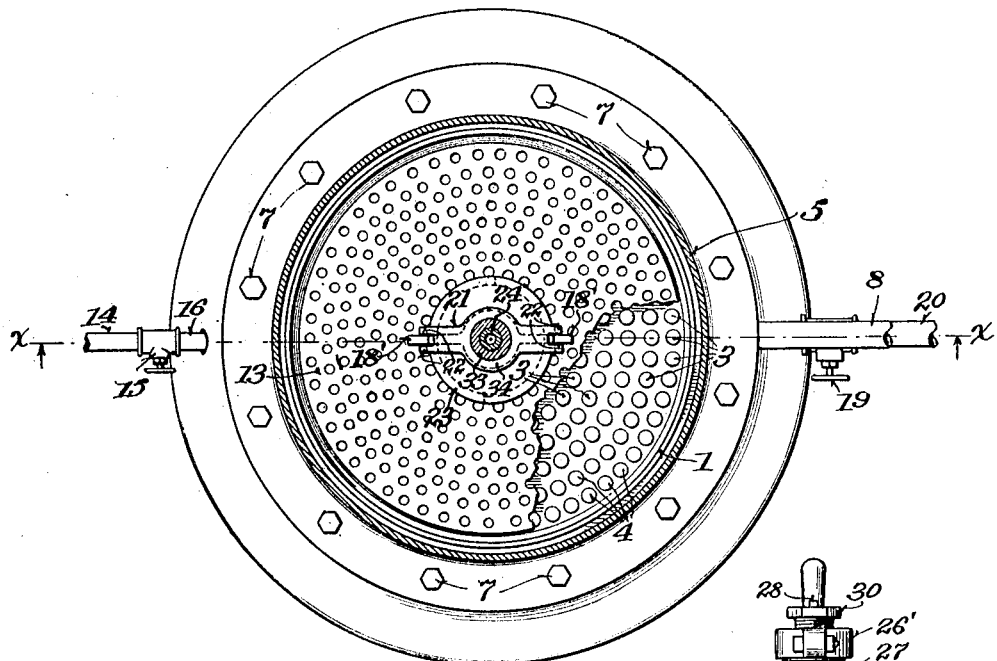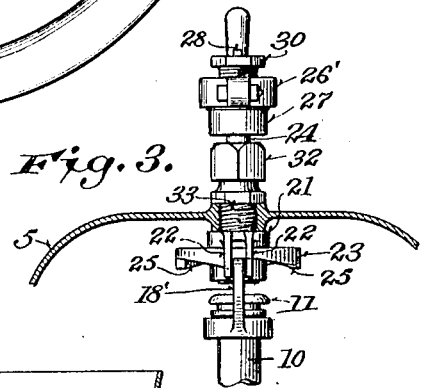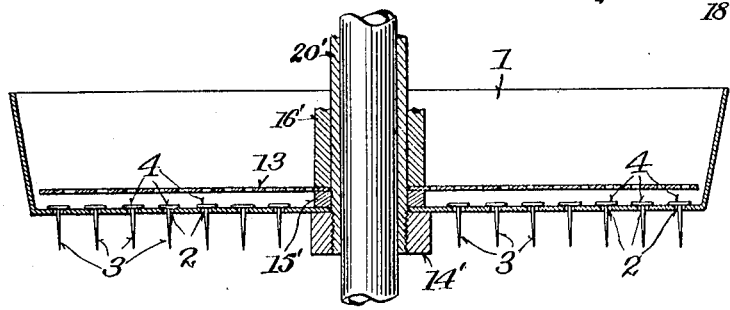

UNITED STATES PATENT OFFICE.

GEORGE H. MAAS, OF MILWAUKEE, WISCONSIN.

CARBONATOR AND THE LIKE.

1,207,061.     Specification of Letters Patent.     Patented Dec. 5, 1916.

Application filed August 19, 1914. Serial No. 857,446.

*To all whom it may concern:*

Be it known that I, GEORGE H. MAAS, citizen of the United States, residing at 738 Jackson street, Milwaukee, county of Milwaukee, and State of Wisconsin, have invented new and useful Improvements in Carbonators and the like, of which the following is a specification.

Experience has proven that when liquid is passed through ordinary unobstructed apertures, it usually flows in a continuous stream that when such apertures are partially obstructed with tacks, pins or other tapered members, the liquid will be retarded and caused by the friction of such members to flow comparatively slowly down said tacks or pins, and escape from the lower end thereof, in a succession of small drops.

The object of my invention is therefore to provide a device for rapidly converting a body of liquid into small drops.

My invention is explained by reference to the accompanying drawings in which—

Figure 1 represents a vertical section drawn on line X—X of Fig. 2, showing a plurality of pans provided with perforations, each perforation of which is provided with a tack or pin. Fig. 2 is a plan view drawn on line Y—Y of Fig. 1; Fig. 3 is a detail part in section of a device for vibrating the liquid supporting pans; and Fig. 4 represents a vertical section of one of the pans and a side view of its supporting shaft.

Like parts are identified by the same reference numerals throughout the several views.

While the object of my invention may be carried out to a certain degree, with a single perforated pan, I prefer a plurality of such pans 1, each of which is provided with a plurality of perforations 2, and each perforation 2 is provided with tapered members. Each member 3 is provided with a support by which it is prevented from dropping through the perforation in which it is located.

While my device may, as stated, be used to facilitate vaporizing gasolene and the like, I have shown and hereinafter described the same as a carbonator for charging water with carbonic acid gas. When thus used, a plurality of pans 1 are supported within an air tight reservoir 5. The reservoir 5 is rigidly secured to a supporting base member 6 by a plurality of bolts 7.

8 is a duct through which water is led to the reservoir 5, passing through the float valve 9, duct 10, and from thence it is discharged through the outlet port 11 into the upper pan 1, thence passing down through the perforations 2, when it flows over the lower end of the tacks 3, and is discharged upon the upper surface of the water in the next succeeding pan 1 below. It will be understood that in case the water therein does not reach a point above the perforated plate 13, the drops will fall upon such plate. It will now be understood that as the water accumulates in the upper pan of the series, it flows through said perforations, passing the tacks or pins, as described, to each succeeding pan below, whereby it is converted into a large number of small drops, whereby the water thus subdivided into drops will absorb a large quantity of carbonic acid gas.

The gas is led to the reservoir 5 from a supply not shown, through the duct 14, valve 15, and ducts 16 and 17. After the water has been thus properly carbonated, it is led from the reservoir to a place of discharge through the duct 18, valve 19, and duct 20. In view of the fact that the perforations 2 are liable, under some conditions to become partially obstructed with refuse matter, I have provided means for vibrating all of said pans, whereby the tacks or pins 3, will be thrown upwardly with a quick positive movement, whereby such refuse matter, if any as has accumulated in said perforations, or upon said tacks or pins, will be quickly removed. To prevent the tacks or pins 3 from being thrown from their perforations by such vibratory movement, I have provided each pan with said perforated plates 13, which plates 13, are supported at a slight distance above the heads of said tacks or pins, whereby the heads of said tacks or pins will contact with said plates 13 before their opposite ends are withdrawn from said perforations, whereby the liability of said tacks or pins being thrown out of their supporting perforations is avoided.

The several pans 1 are secured one above another as shown in Fig. 1, from the central tube 20' by a plurality of collars 14', 15', and 16'. The collar 14' is connected with the periphery of the tube 20' by a screw threaded joint 17'. When this is done, the lower pan 1 is supported on said collar 14', when the collar 15' is put in place around said tube 20', the perforated plate 13 is then placed on said collar 15' by which collar it is supported as is shown at a slight distance above the heads of the tacks or pins. When this is done, the collar 16' is placed around said tube 20' above said plate 13, from which collar 16', the next succeeding pan 1 above is supported. Thus, in like manner a plurality of pans, collars, and plates are supported one above another as shown in Fig. 1. The number of pans, plates, and collars may, however, be increased and diminished as circumstances require. When the upper pan 1, collar 15', and plate 13 have been put in place above the collar 16', the clamp bracket 18', which has screw threaded bearings on the upper end of the tube 20', is turned down against the upper plate 13, whereby all of said plates, pans, and collars are rigidly secured in place upon said tube 20'. It will be understood that the tube 20', pans, collars, and plates thus connected are all slidably supported from the periphery of the tube 10. The bracket 18' is rigidly connected at its lower end, as stated, to the upper end of the tube 20', and is slidably connected with the member 21 between the vertical arms 22—22.

23 is an eccentric cam which is supported on a revoluble shaft 24, and the angular members 25 of said cam are adapted to contact with the upper side of said bracket 18', whereby it will be obvious that, as the shaft 24 is revolved with said cam, said bracket 18' together with said pans, plates, and collars rigidly connected therewith, will be forced downwardly against the spiral spring 26 until said cam passes the bearing surface of said bracket, when said bracket, pans, collars, and other parts, rigidly connected therewith, will be thrown upwardly with a quick positive movement by said spring 26, whereby said tacks or pins will be caused to vibrate in their supporting perforations. A revoluble movement is communicated to said shaft 24, and cam connected therewith from the crank 26' through the housing 27, as described, with each revolution of said crank. 28 is a safety valve of ordinary construction, and the same is held to its seat by the recoil of the spiral spring 29. The tension of the spiral spring 29 is increased and diminished by turning the hollow nut 30 upwardly and downwardly in the housing 27, and the nut 30 is provided with a plurality of apertures 31 for the escapement of gas. Thus it is obvious that any excess of pressure which may be produced in the reservoir 5, will be free to escape through the apertures 31, as the safety valve 28 is raised by such excessive pressure. 32 is a stuffing nut of ordinary construction, by which gas is prevented from escaping around shaft 24. The arms 22 are rigidly connected with the sleeve 33 by the disk 34, and said arms are adapted to prevent said bracket 18' from being turned with the cam wheel 23.

35 is a float by which the valve 9 is actuated. It will be understood that as water accumulates in the reservoir 5, said float will be raised, whereby said valve 9, which is connected with said float through the arm 36, will be automatically closed, also that as the carbonated water is withdrawn from said reservoir 5, said float will descend, whereby said valve will be again opened, and water automatically admitted to said reservoir. The spring 26 rests at its lower end upon the boss 37. The boss 37 is formed integrally with the top 38 of the stand. The legs 39 of the stand rest at their lower ends upon the bottom of the reservoir 5. It will be understood that the openings herein referred to as perforations, formed in the bottom of the pans, may be formed by drilling, puncturing or in any other equivalent manner. Each of the pans 1 comprises a bottom member and sides formed at an angle to and extending upwardly from said botton member, whereby each pan is adapted to retain a quantity of liquid above its bottom, and whereby such liquid is prevented from coming in contact with the walls of its inclosing reservoir, and also whereby a space is formed between said pans and the vertical walls of said reservoir for a free circulation of gas or air.

I claim:

1. In a device of the described class, the combination of a suitable reservoir, a tubular member centrally located in said reservoir, a plurality of pans supported from said tubular member, located in a vertical series in and supported independently of the vertical walls of said reservoir, each of said pans being provided in its bottom with a plurality of perforations, a tapered member suspended in each of said perforations, a perforated plate located above said tapered members, and means for leading a liquid to and from said reservoir.

2. The combination of a suitable reservoir, a plurality of pans located in a vertical series one above another in said reservoir, each of said pans being provided in its bottom with a plurality of perforations, tapered members suspended in each of said perforations, and means for communicating a vibratory movement to said pans.

3. The combination of a suitable reservoir, a plurality of pans located in a vertical series one above another in said reservoir, each of said pans being provided in its bottom with a plurality of perforations, tapered members suspended in each of said perforations, a revoluble crank located above said reservoir, a vertical shaft connected at one end with said crank and extending through the upper end of said reservior, and means for communicating a vibratory movement from said shaft to said pans as said crank is revolved, all substantially as and for the purpose specified.

In testimony whereof I affix my signature in the presence of two witnesses.

GEORGE H. MAAS.

Witnesses:
 JAS. B. ERWIN,
 ALICE J. McKERIHAN.

Copies of this patent may be obtained for five cents each, by addressing the "Commissioner of Patents, Washington, D. C."